(12) United States Patent
Prins et al.

(10) Patent No.: US 11,778,258 B2
(45) Date of Patent: *Oct. 3, 2023

(54) ESTABLISHING A STREAMING PRESENTATION OF AN EVENT

(71) Applicant: Koninklijke KPN N.V., Rotterdam (NL)

(72) Inventors: Martin Prins, The Hague (NL); Omar Aziz Niamut, Vlaardingen (NL); Emmanuel Thomas, Delft (NL); Ray Van Brandenburg, Rotterdam (NL); Hans Maarten Stokking, Wateringen (NL)

(73) Assignee: Koninklijke KPN N.V., Rotterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/399,736

(22) Filed: Apr. 30, 2019

(65) Prior Publication Data

US 2019/0273960 A1    Sep. 5, 2019

Related U.S. Application Data

(63) Continuation of application No. 15/114,709, filed as application No. PCT/EP2015/051581 on Jan. 27, 2015, now Pat. No. 10,313,723.

(30) Foreign Application Priority Data

Jan. 29, 2014 (EP) .................................. 14152981

(51) Int. Cl.
*H04N 21/262* (2011.01)
*H04N 21/218* (2011.01)
(Continued)

(52) U.S. Cl.
CPC ... *H04N 21/26258* (2013.01); *H04N 21/2187* (2013.01); *H04N 21/21805* (2013.01);
(Continued)

(58) Field of Classification Search
CPC ......... H04N 21/21805; H04N 21/2187; H04N 21/25891; H04N 21/26258; H04N 21/482; H04N 21/84; H04N 21/8456
(Continued)

(56) References Cited

U.S. PATENT DOCUMENTS 5,729,471 A    3/1998  Jain et al.
6,487,220 B2   11/2002 Matsuzaki et al.
(Continued)

FOREIGN PATENT DOCUMENTS

CN    1951083 A      4/2007
CN    101543009 A    9/2009
(Continued)

OTHER PUBLICATIONS

Xin Jin, et al., "Cloud Assisted P2P Media Streaming for Bandwith Constrained Mobile Subscribers," In 2010 IEEE 16th International Conference on Parallel and Distributed Systems, pp. 800-805. (2010).
(Continued)

*Primary Examiner* — Jason K Lin
(74) *Attorney, Agent, or Firm* — Hamilton, Brook, Smith & Reynolds, P.C.

(57) ABSTRACT

The invention provides a streaming client with a streaming presentation of an event, with said presentation being obtained by dynamically switching between a plurality of media streams which represent different recordings of the event. For that purpose, source data is obtained from a plurality of stream sources. The source data is constituted by content data and/or metadata of concurrent portions of the
(Continued)

plurality of media streams. By applying a quality assessment function to the source data, a quality score is assigned to each one of the concurrent portions. This allows selection data to be generated which enables the streaming client to access a selected one of the concurrent portions of a respective media stream. For example, a segment may be selected which provides a highest quality score. By doing so, it is therefore not required anymore for a consumer to manually switch between different media streams.

14 Claims, 6 Drawing Sheets

(51) Int. Cl.
*H04N 21/2187* (2011.01)
*H04N 21/84* (2011.01)
*H04N 21/845* (2011.01)
*H04N 21/482* (2011.01)
*H04N 21/61* (2011.01)
*H04N 21/258* (2011.01)

(52) U.S. Cl.
CPC ..... *H04N 21/25891* (2013.01); *H04N 21/482* (2013.01); *H04N 21/4825* (2013.01); *H04N 21/6175* (2013.01); *H04N 21/84* (2013.01); *H04N 21/8456* (2013.01)

(58) Field of Classification Search
USPC ................... 725/97, 109–110, 116
See application file for complete search history.

(56) References Cited

U.S. PATENT DOCUMENTS

| | | | |
|---|---|---|---|
| 6,522,672 B1 | 2/2003 | Matsuzaki et al. | |
| 6,577,333 B2 | 6/2003 | Tai et al. | |
| 7,099,281 B1 | 8/2006 | Conway | |
| 7,286,502 B1 | 10/2007 | Rao | |
| 7,822,869 B2 | 10/2010 | Zuckerman et al. | |
| 7,827,296 B2 | 11/2010 | Zuckerman et al. | |
| 7,835,437 B1 | 11/2010 | Zhang et al. | |
| 7,920,523 B2 | 4/2011 | Grinshpun | |
| 8,159,995 B2 | 4/2012 | Beckmann et al. | |
| 8,612,517 B1* | 12/2013 | Yadid .................. | H04N 21/845 709/201 |
| 8,732,274 B2 | 5/2014 | Bouazizi et al. | |
| 8,767,081 B2 | 7/2014 | Kaheel et al. | |
| 8,806,529 B2 | 8/2014 | Miles et al. | |
| 9,125,073 B2 | 9/2015 | Oyman et al. | |
| 9,292,826 B1 | 3/2016 | Chen et al. | |
| 9,294,531 B2 | 3/2016 | Zhang et al. | |
| 9,300,710 B2 | 3/2016 | Winterrowd et al. | |
| 9,338,209 B1* | 5/2016 | Begen .................. | H04L 65/75 |
| 9,438,883 B2 | 9/2016 | Oyman | |
| 9,479,807 B1* | 10/2016 | Bugajski ............ | H04N 21/6582 |
| 9,661,047 B2 | 5/2017 | Baratz | |
| 9,712,860 B1* | 7/2017 | Waggoner .......... | H04L 65/4084 |
| 10,313,723 B2 | 6/2019 | Prins et al. | |
| 11,265,359 B2 | 3/2022 | Thomas et al. | |
| 2003/0189589 A1 | 10/2003 | LeBlanc et al. | |
| 2004/0071209 A1* | 4/2004 | Burg .................... | H04N 21/658 375/240.01 |
| 2004/0071214 A1* | 4/2004 | Burg .................... | H04N 21/658 375/240.03 |
| 2007/0102764 A1 | 5/2007 | Ando et al. | |
| 2007/0133608 A1 | 6/2007 | Isambart et al. | |
| 2007/0165524 A1 | 7/2007 | Mascolo | |
| 2008/0069086 A1 | 3/2008 | Shin et al. | |
| 2008/0098446 A1 | 4/2008 | Seckin et al. | |
| 2009/0060086 A1 | 3/2009 | Kimmich et al. | |
| 2009/0148124 A1* | 6/2009 | Athsani .............. | H04N 21/6582 386/241 |
| 2009/0238371 A1 | 9/2009 | Rumsey et al. | |
| 2009/0309977 A1 | 12/2009 | Gevrekci et al. | |
| 2009/0319557 A1* | 12/2009 | Lipka .................. | H04N 21/2187 707/999.102 |
| 2009/0325526 A1 | 12/2009 | Chen et al. | |
| 2010/0088425 A1 | 4/2010 | Hooda et al. | |
| 2010/0180315 A1 | 7/2010 | Nakamichi et al. | |
| 2010/0254670 A1 | 10/2010 | Amsterdam et al. | |
| 2011/0082924 A1 | 4/2011 | Gopalakrishnan | |
| 2011/0138020 A1 | 6/2011 | Pantos | |
| 2011/0255535 A1 | 10/2011 | Tinsman | |
| 2011/0280540 A1 | 11/2011 | Woodman | |
| 2011/0302319 A1 | 12/2011 | Ha et al. | |
| 2011/0307781 A1 | 12/2011 | Sood et al. | |
| 2012/0033037 A1 | 2/2012 | Chen et al. | |
| 2012/0018589 A1 | 7/2012 | Riedl et al. | |
| 2012/0185899 A1 | 7/2012 | Riedl et al. | |
| 2012/0185906 A1 | 7/2012 | Doets | |
| 2012/0198506 A1* | 8/2012 | Joe .................... | H04N 21/44209 725/97 |
| 2013/0042015 A1* | 2/2013 | Begen ................ | H04N 21/6125 709/231 |
| 2013/0084053 A1* | 4/2013 | Ackermann ..... | H04N 21/23424 386/241 |
| 2013/0086278 A1* | 4/2013 | Schmidt .............. | H04L 67/1072 709/231 |
| 2013/0194996 A1 | 8/2013 | Oyman | |
| 2013/0301415 A1 | 11/2013 | Archer | |
| 2014/0019593 A1* | 1/2014 | Reznik ............. | H04N 21/26258 709/219 |
| 2014/0282777 A1* | 9/2014 | Gonder ................ | H04L 65/605 725/109 |
| 2015/0026358 A1* | 1/2015 | Zhang ................. | H04N 9/8205 709/231 |
| 2015/0235397 A1 | 8/2015 | Beckman | |
| 2015/0271237 A1* | 9/2015 | Stockhammer .. | H04N 21/26258 709/219 |
| 2016/0088054 A1* | 3/2016 | Hassan ............ | H04N 21/23418 709/219 |
| 2016/0088322 A1* | 3/2016 | Horev .............. | H04N 21/23418 725/14 |
| 2016/0353148 A1 | 12/2016 | Prins et al. | |
| 2017/0310731 A1 | 10/2017 | Thomas et al. | |

FOREIGN PATENT DOCUMENTS

| | | |
|---|---|---|
| CN | 103222277 A | 7/2013 |
| JP | 2007-115293 | 5/2007 |
| JP | 2009-188735 | 8/2009 |
| WO | 2011039293 | 4/2011 |
| WO | WO 2013/004260 | 1/2013 |
| WO | WO 2013/098317 | 7/2013 |
| WO | WO 2015/113960 | 8/2015 |
| WO | WO 2016/059060 | 4/2016 |

OTHER PUBLICATIONS

Van Der Schaar M et al: "Fine-granularity-scalability for wireless video and scalable storage", Visual Communications and Image Processing; Jan. 21, 2002-Jan. 23, 2002; San Jose, pp. 805-816, (Jan. 21, 2002).

"Telecommunications and Internet converged Services and Protocols for Advanced Networking (TISPAN); Resource and Admission Control Sub-System (RACS): Functional Architecture; ETSI ES 282 003", ETSI Standard, European Telecommunications Standards Institute (ETSI), Sophia Antipolis Cedex, France, vol. TISPAN, No. V2.0.0, pp. 1-135 (May 1, 2008).

Dapeng Wu et al: "Scalable Video Coding and Transport over Broad-Band Wireless Networks", Proceedings of the IEEE, IEEE. New York, US, 89(1): 6-20 (Jan. 1, 2001).

Wenger, S., et al., "RTP Payload Format for SVC Video", Internet Draft from the IETF, p. 1-101 (Mar. 6, 2009).

Kofler I et al.: "Improving IPTV services by H.264/SVC adaptation and traffic control", Broadband Multimedia Systems and Broadcasting, 2009. BMSB '09 IEEE International Symposium on, IEEE, Piscataway, NJ, USA, May 13, 2009, pp. 1-6, (May 13, 2009).

(56) References Cited

OTHER PUBLICATIONS

Agarwal et al.; "Adaptive Multi-Source Streaming in Heterogeneous Peer-to-Peer Networks;" SPIE Conf on Multimedia Computing and Networking (2005); 13 pages.

Bouten, N. et al., "QoE optimization through in-network quality adaptation for HTTP Adaptive Streaming," *2012 8th International Conference on Network and Service Management (CNSM)*, pp. 336-342 (Oct. 25, 2012).

Chakareski, J., et al., "Adaptive Multiview Video Streaming: Challenges and Opportunities," *IEEE Communications Magazine*, 94-100 (2013).

Chang, et al., "Real-Time Content-Based Adaptive Streaming of Sports Videos," IEEE, 139-146 (2001).

Cricri, F., et al., "Sensor-Based Analysis of User Generated Video for Multi-camera Video Remising," Advances in Multimedia Modeling: 18th International Conference, MMM 2012, 255-265 (2012).

Extended European Search Report for EP Application No. 14152981.8, dated Oct. 21, 2014.

Gao, B., et al., "Accurate and Low-Delay Seeking WIthin and Across Mash-Ups of Highly-Compressed Videos," Proceedings of the 21$^{st}$ International Workshop on Network and Operating Systems Support for Digital Audio and Video, p. 105 (2011).

Hefeeda et al.; "CollectCast: A peer-to-peer service for media streaming;" Multimedia Systems (2005) 11(1): pp. 68-81.

International Preliminary Report on Patentability for Int'l Application No. PCT/US2015/051581, titled: Establishing a Streaming Presentation of an Event, dated Aug. 2, 2016.

Jansen, J., et al., "Just-in-Time Personalized Video Presentations," Proceedings of the 2012 ACM symposium on Document Engineering, pp. 59-68 (2012).

Lederer et al.; "Towards Peer-Assisted Dynamic Adaptive Streaming over HTTP;" Proceedings of the 19th International Packet Video Workshop (PV 2012); Germany; May 2012; 6 pages.

Li et al.; "MUVIS: Multi-Source Video Streaming Service over WLANs;" Journal of Communications and Networks, vol. 7, No. 2; Jun. 2005; pp. 144-156.

Li et al.; "Network Friendly Video Distribution;" 3rd International Conference on the Network of the Future; 2012; Tunis, Tunisia; 8 pages.

Nguyen et al.; "Distributed Video Streaming Over Internet;" Proceedings of SPIE—The International Society for Optical Engineering; Mar. 2002; 10 pages.

Notification of Transmittal of the International Search Report and the Written Opinion of the International Searching Authority, or the Declaration for PCT/EP2015/051581, entitled: Establishing a Streaming Presentation of an Event, dated Jun. 22, 2015.

Prarthana Shrestha, P., et al., "Automatic Mashup Generation from Multiple-camera Concert Recordings," Proceedings of the International Conference on Multimedia, p. 541 (2010).

Saini, M., et al., "MoViMash: Online Mobile Video Mashup," Proceedings of the 20th ACM international conference on Multimedia, pp. 139-148 (2012).

Seo et al.; "An Experimental Study of Video Uploading from Mobile Devices with HTTP Streaming;" Proceedings of the 3rd Multimedia Systems Conference, Chapel Hill, North Carolina; Feb. 2012; 11 pages.

Stokking et al.; "Social Backup and Sharing of Video using HTTP Adaptive Streaming;" NEM Summit 2013—Implementing Future Media Internet towards New Horizons—Maximising the global value of Content, Media and Networks, Oct. 28-30, 2013, Nantes, France; 6 pages.

Zhe Li et al., "Network friendly video distribution," *2012 Third International Conference on the Network of the Future (NOF)*, pp. 1-8 (Nov. 21, 2012).

"Telecommunications and Internet converged Services and Protocols for Advanced Networking (TISPAN); IPTV Architecture; IPTV Functions Supported by the IMS Subsystem" ETSI TS 182 027 V2.0.0; Feb. 2008, pp. 1-57.

Case, J., et al., "Introduction to Version 2 of the Internet-Standard Network Management Framework," Network Working Group, Request for Comments 1441, Apr. 1993, 14 pages.

Harrington, D. et al., "An Architecture for Describing SNMP Management Frameworks", Network Working Group, Request for Comments 2571, Apr. 1999, pp. 1-58.

Handley, M. et al., "SDP: Session Description Protocol", Network Working Group, Request for Comments 2327, Apr. 1998, pp. 1-40.

"3rd Generation Partnership Project: Technical Specification Group Services and System Aspects; Policy and Charging Control Architecture (Release 9)". 3GPP TS 23.203. V9.0.0. Mar. 2009. pp. 1-113.

Deering. S. et al., "Multicast Listener Discovery (MLD) for IPV6", Network Working Group. Request for Comments 2710. Oct. 1999. pp. 1-21.

Vida. R. et al., "Multicast Listener Discovery Version 2 (MLDv2) for IPV6", Network Working Group. Request for Comments 3810. Jun. 2004. pp. 1-62.

Holbrook. H. et al., "Using Internet Group Management Protocol Version 3 (IGMPv3) and Multicast Listener Discovery Protocol Version 2 (MLDv2) for Source-Specific Multicast", Network Working Group. Request for Comments 4604. Aug. 2006. pp. 1-12.

Calhoun. P. et al., "Diameter Base Protocol", Network Working Group. Request for Comments 3588. Sep. 2003. pp. 1-147.

Schulzrinne. H. et al., "Real Time Streaming Protocol (RTSP)", Network Working Group. Request for Comments 2326. Apr. 1998. pp. 1-86.

Schulzrinne. H. et al., "RTP: A Transport Protocol for Real-Time Applications", Network Working Group. Request for Comments 3550. Jul. 2003. pp. 1-98.

Rosenberg. J_ et al., "Best Current Practices for Third Party Call Control (3PCC) in the Session Initiation Protocol (SIP)", Network Working Group. Request for Comments 3725. Apr. 2004. pp. 1-32.

\* cited by examiner

ESTABLISHING A STREAMING PRESENTATION OF AN EVENT

RELATED APPLICATIONS

This application is a continuation of U.S. application Ser. No. 15/114,709, filed Jan. 27, 2015, which is the U.S. National Stage of International Application No. PCT/EP2015/051581, filed on Jan. 27, 2015, published in English, and claims priority under 35 U.S.C. § 119 or 365 to European Application No. 14152981.8, filed Jan. 29, 2014. The entire teachings of the above applications are incorporated herein by reference.

FIELD OF THE INVENTION

The invention relates to a system and method for providing a streaming client with a streaming presentation of an event. The invention further relates to a streaming client for use with the system and method, and to a manifest for the streaming client. The invention further relates to a computer program product comprising instructions for causing a processor system to perform the method.

BACKGROUND ART

Recording devices such as digital cameras and mobile phones are ubiquitous nowadays. Accordingly, an event, such as a concert, game, party, etc, may be simultaneously recorded by multiple recording devices, thereby obtaining multiple recordings of the same event. Such multiple recordings may differ in various ways. For example, the recordings may show the event from different viewing positions. Another example is that the type of recording may differ, being, e.g., a video recording, a stereoscopic video recording, an audio recording, etc. In particular, the recordings may differ in quality. For example, the recordings may differ in content quality, e.g., by having a (un)restricted viewing angle or (un)suitable distance to the event. The recordings may also differ in recording quality, e.g., by originating from recording devices with different technical capabilities, being encoded with different bitrates, etc. Such content quality and recording quality is henceforth in short referred to as 'quality'.

The different recordings of the event may be made available by means of streaming. In such a case, the different recordings may be represented by a plurality of media streams, with the plurality of media streams being accessible from a respective plurality of stream sources. Examples of media streams include video streams such as camera-recorded streams, audio streams such as microphone-recorded streams, and multimedia streams comprising different types of media streams. Accordingly, when using a streaming client having access to the plurality of media streams, a consumer may manually select a media stream for rendering, e.g., to switch camera view.

Disadvantageously, manually switching between different media streams is cumbersome as a consumer typically cannot readily compare the different streams and thus is unable to readily select a media stream according to his/her preference.

SUMMARY OF THE INVENTION

It would be advantageous to obtain a system or method which provides a streaming client with a streaming presentation of an event while addressing at least one drawback of the known prior art.

A first aspect of the invention provides a system and method for providing a streaming client with a streaming presentation of an event, the streaming presentation having been obtained by dynamically switching between a plurality of media streams which represent different recordings of the event, the plurality of media streams being accessible from a respective plurality of stream sources.

The system may comprise:
an input for obtaining source data from the plurality of stream sources, the source data being constituted by content data and/or metadata of concurrent portions of the plurality of media streams, the concurrent portions representing concurrent time periods of the event;
a processing subsystem configured for:
i) applying at least one quality assessment function to the source data for assigning a quality score to each one of the concurrent portions, thereby establishing a plurality of quality scores; and
ii) generating selection data for enabling the streaming client to access a selected one of the concurrent portions of a respective media stream, the selected portion having been selected based on a comparison of the plurality of quality scores.

The method may comprise:
obtaining source data from the plurality of stream sources, the source data being constituted by content data and/or metadata of concurrent portions of the plurality of media streams, the concurrent portions representing concurrent time periods of the event;
applying at least one quality assessment function to the source data for assigning a quality score to each one of the concurrent portions, thereby establishing a plurality of quality scores; and
generating selection data for enabling the streaming client to access a selected one of the concurrent portions of a respective media stream, the selected portion having been selected based on a comparison of the plurality of quality scores.

Another aspect of the invention provides a computer program product comprising instructions for causing a processing system to perform the method.

Embodiments are defined in the dependent claims.

The above aspects involve a plurality of stream sources. Each of the stream sources may constitute a streaming source for a different recording of the event. Accordingly, the stream sources may provide alternative recordings of a same event. The streaming may be live, thereby coinciding with the event itself.

Source data may be obtained from the plurality of stream sources. The source data may be constituted by content data, i.e., representing a part of a video stream, audio stream, etc. Additionally or alternatively, the source data may be constituted by metadata for the respective media stream. Such metadata may be indicative of a context of the respective recording or characterize the recording.

The source data may be associated with concurrent portions of media streams. Here, the term 'concurrent portions' refers to parts of the respective media streams which correspond to a common time period of the event. As such, the concurrent portions may constitute alternative recordings for said period in time. It is noted that the concurrent portions may be explicitly present in the respective media streams, e.g., by the media streams being segmented. However, this does not need to be the case in that the media streams may equally constitute non-segmented media streams. Also, in the case of segmented media streams, the segments do not need to be of the same length and/or synchronised. Rather, it may suffice that the segments overlap in event time and thereby comprise concurrent portions.

A quality assessment function may be applied to the source data. By doing so, a quality score may be assigned to each of the concurrent portions, and thereby implicitly also to the respective media stream and stream source. Accordingly, each concurrent portion may be rated, e.g., on a quality scale, which may allow a quality comparison between the concurrent portions. It is noted that such a quality assessment function may assess content quality and/or recording quality, and in general may involve taking user feedback into account. It is further noted that such quality assessment functions are known per se from the field of signal analysis.

Moreover, selection data may be generated which may be used to select one of the concurrent portions. In determining which concurrent portion is to be selected, use may be made of the plurality of quality scores in that a portion may be selected of which the concurrent portion has been assigned a highest quality score, or in general, a quality score which is deemed to be suitable, e.g., by a criterion. Accordingly, the selection data is explicitly or implicitly indicative of the most suitable concurrent portion, e.g., by comprising a stream identifier of a stream comprising the concurrent portion, a segment identifier identifying a segment representing the concurrent portion, a quality score associated with the stream or the segment, etc.

The above measures provide a system which effectively functions as a proxy, i.e., an intermediary, between a streaming client and a plurality of stream sources in that the system assesses the quality of concurrent portions of a plurality of media streams and generates selection data which enables the streaming client to specifically access one of the concurrent portions of a respective media stream based on a comparison of quality scores. For example, the selected portion may have been assigned a highest quality score. By assessing the quality of consecutive ones of such concurrent segments, the selection data enables a streaming client to consecutively access the segments of those media streams which currently provide a particular quality. As such, a streaming presentation of the event may be established which constitutes a dynamic selection of different portions of the plurality of media streams. It is noted that although it is probably beneficial that the processing subsystem applying the quality assessment is comprised in or located near the stream sources, or in the network, it is not precluded that the processing subsystem is comprised in or located near the streaming client. For example, if there is enough bandwidth available to deliver the relevant streams to the streaming client, the quality assessment function may be performed in or near the streaming client, and the following advantages still apply.

An advantage may be that it is not required anymore for a consumer to manually switch between different media streams. Another advantage may be that the system is well suited for use in a scenario where the plurality of stream sources constitutes an independent, unmanaged set of stream sources.

In this respect, it is noted that a paper titled "MoViMash: Online Mobile Video Mashup" by Saini, Mukesh Kumar, et al., Proceedings of the 20th ACM international conference on Multimedia. ACM, 2012, describes creating a 'mashup' of several video clips. However, this differs from the present invention since the described framework constitutes an automation of video editing during post-production, and therefore is unsuitable for being employed in a streaming context where an aim is to provide a streaming client with a streaming presentation of an event.

In an embodiment, the streaming client may be provided with a manifest, the manifest may comprise address information for enabling the streaming client to access the plurality of stream sources, and wherein:
    the system may further comprise a client interface for providing the selection data to the streaming client; and
    the selection data may be generated by the processing subsystem to enable the streaming client to select, from the manifest, one of the plurality of stream sources which provides access to said selected portion.

Within the field of streaming of media streams, it is known to provide a streaming client with a manifest. The manifest may identify different media streams and their address information, i.e., from which stream source the respective media stream may be accessed. In this embodiment, the streaming client may be provided with a manifest which enables the streaming client to access the plurality of stream sources, and as such the media streams provided by said stream sources. By generating the selection data in the claimed manner, the streaming client may be enabled to identify from the manifest which stream source is to be accessed in order to obtain the selected portion. An advantage of this embodiment may be that the streaming client may directly access the selected stream source. Accordingly, it is not needed for the system to be involved in the delivery of (portions of) media streams. A further advantage may be that the actual selection may be performed by the streaming client, thereby enabling the streaming client to take other, e.g., local, considerations into account. Moreover, use may be made of existing manifests and their delivery mechanisms. Hence, it may suffice to only additionally provide the selection data to the streaming client.

In an embodiment, the selection data may comprise at least part of the plurality of quality scores. Accordingly, the streaming client may be directly provided with quality scores. In this embodiment, the streaming client may match the quality scores to the respective stream sources, as identified in the manifest, in order to determine which stream source and thus which media stream is to be accessed.

In an embodiment, the processing subsystem may be configured for:
    i) formatting said quality scores as a metadata stream;
    ii) including address information in the manifest for enabling the streaming client to access the metadata stream.

By formatting the quality scores as a metadata stream and generating the manifest to include said address information, the quality scores may be delivered to the streaming client in a similar manner as the media streams themselves, namely in the form of a stream and by the manifest providing address information to the stream. An advantage of this embodiment may be that existing delivery mechanisms may be re-used, such as those for the delivery of metadata streams in MPEG-4 Part 14. Here, only a new stream identifier may have to be declared to identify the metadata stream comprising the quality scores. Accordingly, this may avoid the need for an additional delivery mechanism for delivering the quality scores to streaming client(s).

In an embodiment, the client interface may be configured for providing the selection data to the streaming client via a signalling channel. By providing the selection data to the streaming client via a signalling channel, it is not needed to rely on existing delivery mechanisms for said delivery. Accordingly, the selection data may be provided to the streaming client even if the standard used for streaming the plurality of media streams does not explicitly provide for a delivery mechanism for such selection data to be delivered. For example, when using MPEG Dynamic Adaptive Streaming over HTTP (DASH), such a signalling channel may be used to deliver the selection data even if MPEG-DASH does not provide for a suitable delivery mechanism.

In an embodiment, the selection data may be provided asynchronously from providing the manifest to the streaming client. By delivering the selection data asynchronously with the manifest, their delivery is decoupled in time.

In an embodiment, the selection data may further comprise association information for enabling the streaming client to associate the plurality of quality scores with the plurality of stream sources. As such, the streaming client may be provided with information which enables said quality scores to be associated with the plurality of stream sources. Such association information may be explicit or implicit. An example of the latter may be an ordering of the plurality of quality scores which matches the ordering of the address information of the stream sources in the manifest.

In an embodiment, the processing subsystem may be configured for generating a manifest for the streaming client, the manifest comprising a playlist identifying different portions of the plurality of media streams for being consecutively accessed from respective ones of the plurality of stream sources, at least one of the different portions having been selected based on the selection data. In this embodiment, the system rather than the streaming client performs the selection of the respective media streams. Rather than delivering the plurality of quality scores to the streaming client, the system provides a playlist which represents a selection, e.g., by consecutively identifying portions which have been assigned a suitable quality score. Accordingly, the streaming client may obtain a streaming presentation of the event by accessing the plurality of stream sources in accordance with the playlist.

In an embodiment, the processing subsystem may be configured for updating the manifest for a new concurrent portion. This embodiment takes into account that during streaming, it may not be possible to generate a manifest for an entire media stream as the quality of future, i.e., yet to be streamed, portions may still be unknown. Accordingly, the manifest may be updated overtime.

In an embodiment, the processing subsystem may be configured for, when generating the selection data, maintaining a previous selection of one of the plurality of media streams when:
  a difference in quality score between a concurrent portion of said previous media stream and the selected portion is below a quality threshold; or
  a length of the concurrent portion is below a length threshold.

This embodiment takes into account that it may not always be desirable to switch to another media stream even though its concurrent portion has been assigned a suitable quality score. Namely, when a length of the concurrent segment or a difference in quality with the concurrent portion of a previously selected media stream is below a respective threshold, the disadvantages of such switching may outweigh the advantage in terms of quality. Accordingly, a previous selection may be maintained.

In an embodiment, the plurality of media streams may comprise one or more segmented media streams, and the concurrent portions may be constituted at least in part by concurrent segments of the one or more segmented media streams. Segmented media streams are constituted by consecutive segments. Such explicitly defined segments provide a natural granularity for dynamically switching between media streams. Examples of such segmented media streams include those provided for adaptive bitrate streaming. It may therefore be convenient to, on a segment-by-segment basis, select those segments which have been assigned a suitable quality score. Conversely, it may not be needed to additionally segment the one or more segmented media streams, nor is it needed to use or define a different granularity.

In an embodiment, the system may be configured acting as a proxy between the streaming client and the plurality of stream sources by:
  i) receiving the concurrent portions of the plurality of media streams from the plurality of stream sources; and
  ii) delivering the selected portion to the streaming client.

Accordingly, rather than delivering the selection data to the streaming client, the system selects and subsequently delivers the selected portion to the streaming client. An advantage of this embodiment may be that the streaming client may be provided with a media stream obtained by dynamically switching between media streams, without the streaming client having to be involved or even aware of such dynamic switching. A further advantage may be that it is not needed to provide the selection data to the streaming client, thereby avoiding a need for a delivery mechanism.

In an embodiment, at least one of the plurality of media streams may be received in non-segmented form, and processing subsystem may be configured for segmenting said media stream. By segmenting said media stream, a natural granularity is established for dynamically switching between media streams. It is therefore convenient to, on a segment-by-segment basis, switch between media streams to obtain those segments which have been assigned a suitable quality score.

In an embodiment, the selected portion is selected based on the selected portion having a highest quality score amongst the concurrent portions. A highest quality score may indicate a highest suitability for being included in the streaming presentation of the event, in that the one or more quality assessment functions have deemed the selected portion to provide the highest quality, e.g., to a consumer.

Another aspect of the invention provides a streaming client for use with the system. The streaming client may be configured for obtaining a manifest, with the manifest comprising address information for enabling the streaming client to access the plurality of stream sources. The streaming client may further comprise:
  an input for receiving the selection data from the system; and
  a processing subsystem configured for:
  i) based on the selection data, selecting from the manifest one of the plurality of stream sources which provides access to the selected portion; and
  ii) accessing the selected portion from said streaming source.

Accordingly, a streaming client is provided which may be configured for obtaining selection data from the system, e.g., in the form of quality scores, and for subsequently performing the selection based on the selection data.

Another aspect of the invention provides a manifest for a streaming client, the manifest comprising address information for enabling the streaming client to access selection data as generated by the system. Accordingly, in addition to other information, such as address information to the plurality of stream sources, the manifest comprises address information to the selection data. Therefore, a streaming client obtaining the manifest is enabled to access the selection data.

In summary, the invention may provide a streaming client with a streaming presentation of an event, with said presentation being obtained by dynamically switching between a plurality of media streams which represent different recordings of the event. For that purpose, source data may be obtained from a plurality of stream sources. The source data may be constituted by content data and/or metadata of concurrent portions of the plurality of media streams. By applying a quality assessment function to the source data, a quality score may be assigned to each one of the concurrent portions. This allows selection data to be generated which may enable the streaming client to access a selected one of the concurrent portions of a respective media stream. For example, a segment may be selected which provides a highest quality score. By doing so, it is therefore not required anymore for a consumer to manually switch between different media streams.

It will be appreciated by those skilled in the art that two or more of the above-mentioned embodiments, implementations, and/or aspects of the invention may be combined in any way deemed useful.

Modifications and variations of the method, the computer program product, the streaming client and/or the manifest, which correspond to the described modifications and variations of the system, can be carried out by a person skilled in the art on the basis of the present description.

The invention is defined in the independent claims. Advantageous yet optional embodiments are defined in the dependent claims.

BRIEF DESCRIPTION OF THE DRAWINGS

These and other aspects of the invention are apparent from and will be elucidated with reference to the embodiments described hereinafter. In the drawings.

Figure 1:
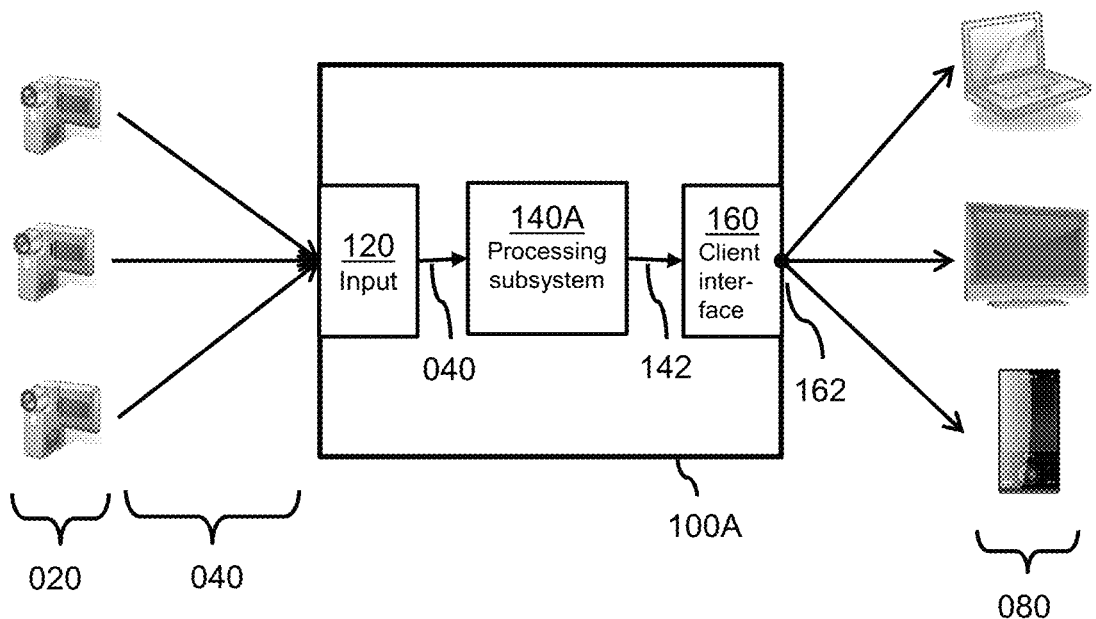
FIG. 1 shows an embodiment of a system according to the invention.

It should be noted that items which have the same reference numbers in different Figures, have the same structural features and the same functions, or are the same signals. Where the function and/or structure of such an item has been explained, there is no necessity for repeated explanation thereof in the detailed description.

LIST OF REFERENCE NUMERALS IN FIGS. 1 AND 4-7

020 plurality of stream sources;
021 first stream source;
022 second stream source;
031 first segment server;
032 second segment server;
040 source data from the plurality of stream sources;
041 first source data from the first stream source;
042 second source data from the second stream source;
043 selection from the first source data and the second source data;
080 plurality of streaming clients;
081 first streaming client;
100A-E embodiments of a system in accordance with the invention;
120 input;
140A-C embodiments of processing subsystem;
142 selection data;
160 client interface;
162 communication with streaming client(s);
164 communication with streaming client(s) via signalling channel;
170 manifest;
172 description of segments of available media streams;
174 description of metadata stream;
180 selection data;
300 quality assessment function unit;
310 quality score database;
400 transmission of quality scores(s);
410 request for manifest/segment;
412 transmission of segment/manifest/quality score(s);
414 transmission of manifest/quality score(s);
421 communication with first segment server;
422 communication with second segment server;
430 communication with quality score database;
440 reading/writing of manifest;
451 segment request to first segment server; and
452 segment request to second segment server.

DETAILED DESCRIPTION OF EMBODIMENTS

FIG. 1 shows an embodiment of the invention in the form of a system 100A. Further shown is a plurality of stream sources 020 which provide access to a respective plurality of media streams. FIG. 1 shows the plurality of stream sources 020 in the form of a plurality of recording devices which comprise audiovisual sensors. Examples of such recording devices 020 include smartphones, compact cameras, professional cameras, smart-watches, smart-glasses, etc. However, this is not a limitation in that the plurality of stream sources 020 may also comprise other types of devices or systems, such as streaming servers which by themselves are unable to record the event but rather enable such recordings to be streamed as media streams. Another example is a stream buffer which buffers a media stream within a media distribution network.

The system 100A comprises an input 120 for obtaining source data 040 from the plurality of stream sources 020. For that purpose, the system 100A may be connected to the plurality of stream sources 020 via a network (not explicitly shown in FIG. 1) such as a local area network, a wide area network, and/or the Internet. FIG. 1 shows the source data 040 being obtained from each of the plurality of stream sources 020, i.e., in the form of separate data from each of the plurality of stream sources 020. Alternatively, the source data 040 may be obtained from a subset of the stream sources 020, be obtained indirectly from said stream sources 020, or be obtained from another source. The source data 040 may be constituted by content data and/or metadata of at least concurrent portions of the plurality of media streams. For example, in case of a MPEG-4 Part 14 (MP4)-based media stream, the source data may be constituted by information embedded by a recording source as a metadata track in a MP4 container. Such embedding may involve defining a stream identifier for each type of data, e.g., by declaring a codec force per respective type of data.

The system 100A further comprises a processing subsystem 140A, which may be constituted by hardware, software or a combination of hardware and software. Such hardware and/or software may be distributed over several functional units.

The processing subsystem 140A may be configured for, during operation of the system 100A, applying at least one Quality Assessment Function (QAF) to the source data 040. For that purpose, the processing subsystem 140A is shown to receive the source data 040 from the input 120. By applying the one or more quality assessment functions to the source data 040, a quality score may be assigned to each one of the concurrent portions, thereby establishing a plurality of quality scores. Here, it is noted that the term 'assigning' refers to each quality score being associated or associateable with the respective portion, e.g., by being tagged, stored in relation to an identifier of the portion, etc. It is noted that the quality score as obtained by the one or more quality assessment functions may also be referred to as Quality Assessment score (QA score), with this aspect of the invention being further explained with reference to FIGS. 2, 3 and 8. Moreover, although not shown in FIG. 1, the quality scores may be (temporarily) stored, e.g., in an internal or external repository or file.

The processing subsystem 140A may be further configured for, during operation of the system 100A, generating selection data 142 for enabling the streaming client to access a selected one of the concurrent portions of a respective media stream, with the selected portion having been selected based on a comparison of the plurality of quality scores. By doing so, and in particular by accessing consecutive of such portions, the streaming client is provided with a streaming presentation of the event. It is noted that such selection data 142 may take various forms. FIG. 1 shows an optional aspect of the invention, in that the selection data 142 is provided to the streaming client itself, namely by way of a client interface 160 of the system 100A providing the selection data 142 to a plurality of streaming clients 080 via an exchange of messages 162. It is noted that this aspect of the invention, as well as alternative forms of the selection data 142 and delivery to the streaming client, will be further explained with reference to FIGS. 4 to 8.

It is noted that, in general, streaming clients 080 may comprise TVs, DVB players and recorders, mobile (smart) phones, cameras, digital radio's, music (MP3) players, PCs, laptops, tablets, smart-watches, smart-glasses, set-top boxes, media players, car hi-fi installations, professional audio and video equipment, etc.

It is further noted that the source data 040 may comprise content data in the form of bitstream data of the respective media stream. Such bitstream data may comprise audiovisual data, such as encoded video and audio samples. In particular, if the media streams are segmented media streams, the source data 040 may be constituted by the bitstream data of the respective segments. To obtain such bitstream data, the system 100A may subscribe to streaming sessions provided by the plurality of stream sources 020. Additionally or alternatively, the source data 040 may comprise metadata. The metadata may be generated by the recording device, and may relate to one or more audiovisual sensors of the recording device, e.g., by indicating saturation, occlusion, clipping, silence, etc. The metadata may also relate to other sensors in the device, such as location sensors (e.g., a Global Positioning System (GPS) sensor), gyroscopes, accelerometers, etc. Accordingly, the metadata may indicate, e.g., a location, direction, lateral movement, etc. The metadata may also relate to timing information, e.g., by indicating timestamps, Network Time Protocol (NTP) information, etc. It is noted that the metadata may be included in the respective media stream, but may equally be provided in separation thereof.

Figure 2:
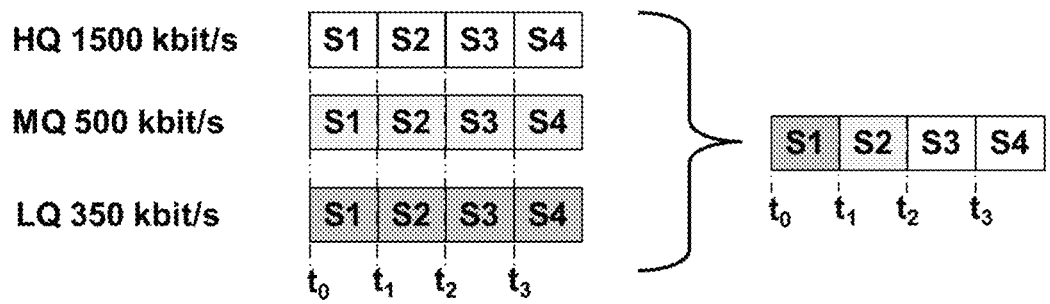
FIG. 2 illustrates segmented media streams obtained by encoding a same recording at different bitrates, thereby enabling adaptive bitrate streaming.

FIG. 2 illustrates segmented media streams as known per se from the field of adaptive bitrate streaming, and in particular the sub-field of HTTP Adaptive Streaming (HAS). With HAS, an audiovisual media stream may be offered in different representations of bitrate and thus quality. For example, a recording may be encoded at 350 kbit/s to provide a Low Quality (LQ) media stream, at 500 kbit/s to provide a Medium Quality (MQ) media stream, and at 1500 kbit/s to provide a High Quality (HQ) media stream. Each media stream may consist of a sequence of consecutive segments S1-S4, which may be independently accessible, transferable and decode-able. Accordingly, segments from the different media streams may be inter- and/or exchanged, thereby enabling a streaming client to switch between the different media stream based on the available bandwidth. This may enable seamless playback, e.g., by preventing or reducing buffering, as a streaming client may temporarily switch to a media stream having a lower quality but requiring a lower transmission bandwidth.

Figure 3:
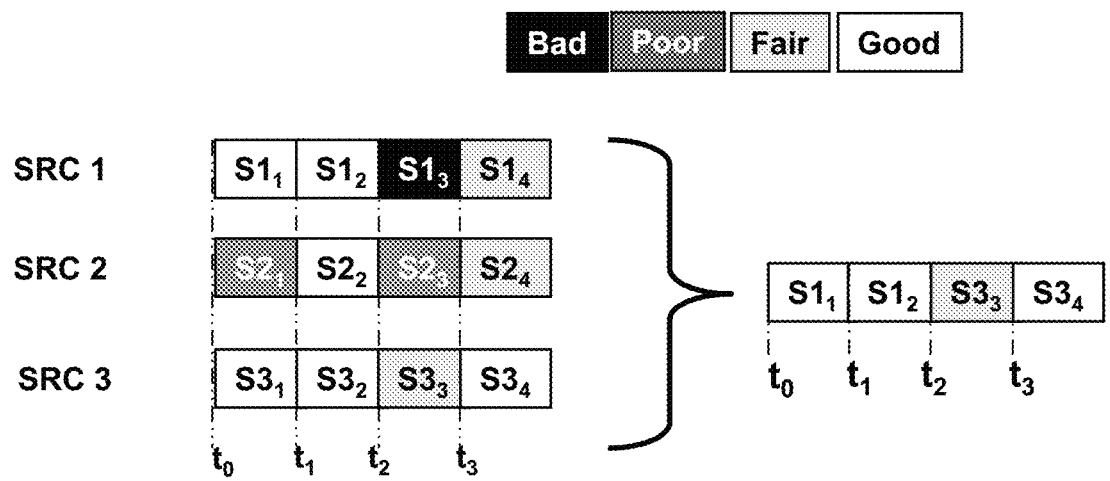
FIG. 3 illustrates an aspect of the invention in that it shows segmented media streams constituting different recordings of a same event, with a quality score having been assigned to each segment of the segmented media streams.

FIG. 3 illustrates segmented media streams constituting different recordings of a same event. The media streams are labelled 'SRC 1', 'SRC 2' and 'SRC 3' denoting that the media streams originate from different stream sources. It is noted that unlike the media streams of FIG. 2, the media streams of FIG. 3 each represent different content, e.g., different audiovisual recordings. However, the media streams are nevertheless associated by representing different recordings of a same event. It has been recognized that one or more basic principles employed in HAS can be used in the present context as well, namely to establish a streaming presentation which is comprised of segments of different media streams which provide a best experience to a viewer, e.g., a consumer. For quantifying the best experience, use may be made of one or more quality assessment functions. Such quality assessment function(s) may rate each concurrent segment on a predefined quality scale. In FIG. 3, the concurrent segments are indicated by a same subscript (last) numeral, e.g., $S1_1$, $S2_1$ and $S3_1$. The quality scale in FIG. 3 uses four different quality scores, namely 'Bad', 'Poor', 'Fair' and 'Good'. However, various other kinds of quality scales are equally conceivable. For example, the quality scale may range from 0 to 1, where a 1 indicates a highest possible quality and 0 a lowest possible quality. An alternative may be a Mean Opinion Score (MOS) quality scale ranging from 1, i.e., lowest quality, to 5, i.e., highest quality.

By applying the one or more quality assessment function to the aforementioned source data, each of the segments may be rated in terms of quality. Such rating may rate one quality-related aspect of each concurrent segment, but may equally take several quality-related aspects into account. For example, the quality assessment function may rate content quality, e.g., by detecting occlusions, steadiness of video, discernibility of speech, etc, as well as recording quality, e.g., by determining the spatial resolution, frame rate and/or bitrate of each concurrent segment. Alternatively, different quality assessment functions may be used, with their quality scores being combined. Having rated each segment, it can be determined which of the concurrent segments provided a suitable, e.g., highest, quality. In the example of FIG. 3, this results in stream 1 providing the highest quality of the concurrent segments $S1_1$-$S3_1$, $S1_2$-$S3_2$ and $S1_4$-$S3_4$, and stream 3 providing the highest quality of the concurrent segments $S1_3$-$S3_3$. Accordingly, a streaming presentation may be established comprised of segments $S1_1$, $S1_2$, $S3_2$, $S3_4$ which represents an, on average, higher quality media stream than each individual media stream SRC 1, SRC 2 and SRC 3.

The streaming presentation may be established based on the system generating selection data. This selection data, and delivery to the streaming client, make take various forms, and will be further explained with reference to FIGS. 4 to 8.

Figure 4:
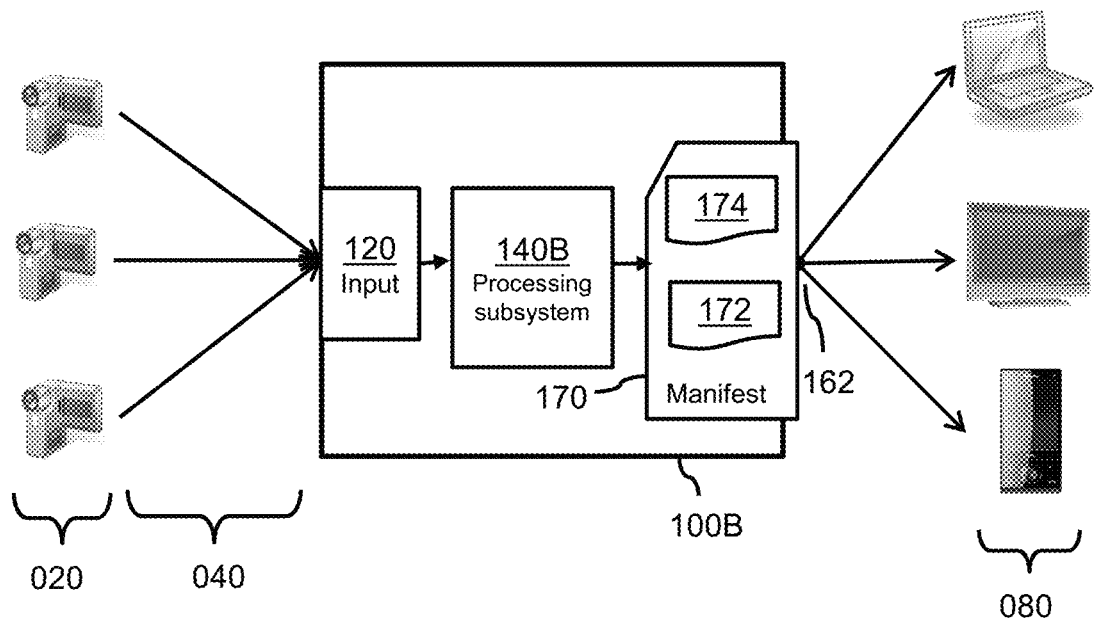
FIG. 4 shows a further embodiment of a system according to the invention, in which the selection data is formatted as a metadata stream, with the metadata stream being made accessible to the streaming clients by including address information to the metadata stream in a manifest for the streaming clients.

FIG. 4 shows an embodiment of a system 100B according to the invention, in which the selection data is formatted as a metadata stream. Here and in the following figures, the client interface is not explicitly shown, instead showing a graphical representation of the data generated by the processing subsystem 140B and made available to the plurality of streaming clients 080 via the client interface.

In the embodiment of FIG. 4, the streaming client(s) 080 are provided with a manifest 170 which comprises address information 172 for enabling the streaming client(s) to access the plurality of stream sources 020. Such a manifest 170 may be based on a known type of manifest. For example, within the context of media streaming based on MPEG-DASH, the manifest may be based on a Media Presentation Description (MPD) as defined by MPEG-DASH, which may describe the segments of the available media streams and the addresses of the respective stream sources 020 from which the segments are accessible. Such addresses may take any suitable form, including but not limited to a Uniform Resource Locator (URL) address. For example, the MPD may identify the metadata stream(s) in the following manner (here, the AdaptationSet information for audio has been omitted for conciseness reasons):

```
<?xml version="1.0" encoding="UTF-8"?>
<MPD
    xmlns:xsi="http://www.w3.org/2001/XMLSchema-instance"
    xmlns="urn:mpeg:DASH:schema:MPD:XXXX"
    xsi:schemaLocation="urn:mpeg:dash:schema:mpd:2011
    DASH-MPD.xsd"
    <BaseURL>http://cdn1.example.com/</BaseURL>
    <BaseURL>http://cdn2.example.com/</BaseURL>
    <Period>
        <!-- Video -->
        <AdaptationSet
            id="video"
```

-continued

```
            mimeType="video/mp4"
            codecs="avc1.4D401F"
            frameRate="30000/1001"
            segmentAlignment="true"
            startWithSAP="1">
            <BaseURL>video/</BaseURL>
            <SegmentTemplate timescale="90000"
            media="$Bandwidth$/$Time$.mp4v">
                <SegmentTimeline>
                    <S t="0" d="180180" r="432"/>
                </SegmentTimeline>
            </SegmentTemplate>
            <Representation id="v0" width="320" height="240"
            bandwidth="250000"/>
            <Representation id="v1" width="640" height="480"
            bandwidth="500000"/>
            <Representation id="v2" width="960" height="720"
            bandwidth="1000000"/>
        </AdaptationSet>
        <!—AdaptationSet for selection data -->
        <AdaptationSet id="quality_scores" codecs="wxyz"/>
            <BaseURL>video_quality/</BaseURL>
            <SegmentTemplate timescale="90000"
            media="$id$/$Time$.mp4m">
                <SegmentTimeline>
                    <S t="0" d="180180" r="432"/>
                </SegmentTimeline>
            </SegmentTemplate>
            <Representation id="quality_scores_v0"
bandwidth="1000" dependencyId="v0"/>
            <Representation id="quality_scores_v1"
bandwidth="1000" dependencyId="v1"/>
            <Representation id="quality_scores_v2"
bandwidth="1000" dependencyId="v2"/>
        </AdaptationSet>
    </Period>
</MPD>
```

Such a manifest 170 may be provided by the system 100B to the streaming client(s), e.g., via an exchange of messages 162, and may include the aforementioned description 172 of segments of the available media streams. In accordance with the invention, the processing subsystem 140B may use the manifest 170 to make the selection data accessible to the streaming client(s), thereby enabling the streaming client(s) to identify one of the stream sources from the manifest 170 which provides a suitable quality. Such selection data may take the form of one or more quality scores. The processing subsystem 140B may format the quality scores as a metadata stream, and generate the manifest 170 to include a description 174 of the metadata stream. Such a description 174 may comprise address information, e.g., an URL address, thereby enabling the streaming client to access the metadata stream via the address.

Figure 5:
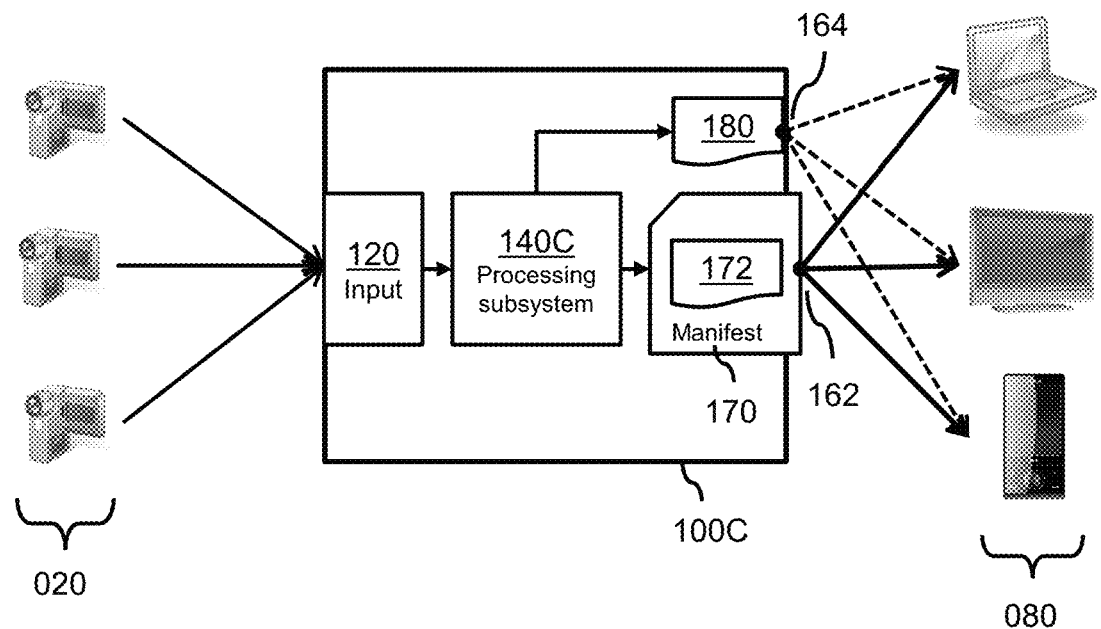
FIG. 5 shows a further embodiment of a system according to the invention, in which the selection data is provided to the streaming client via a signalling channel.

FIG. 5 shows a further embodiment of a system 100C according to the invention, in which the selection data 142 is directly provided to the streaming client(s) via a signalling channel. The signalling channel is shown in FIG. 5 implicitly, namely by an additional exchange of messages 164 which is separated from the exchange of messages 162 providing the manifest 170 to the streaming client(s). It is noted that the selection data 142 may be provided asynchronously, i.e., without being explicitly synchronized, with the providing of the manifest 170 to the streaming client(s).

As signalling channel, a so-termed streaming control channel may be used, as described in, e.g., WO 2013/098317 A1. Herein, a method is described for enabling network-initiated control of streaming of segmented content from a delivery node, i.e., a streaming source, to at least one streaming client. The method comprises providing the streaming client with channel set-up information and subsequently establishing at least one streaming control channel between said client and a control channel server function on the basis of said provided channel set-up information. Accordingly, the streaming client may receive at least one manifest file update message via said streaming control channel which may comprise a manifest file or manifest file location information for locating the manifest file. It will be appreciated that the therein described streaming control channel and ways of providing manifest information to a streaming client may be advantageously used in the present context, i.e., to provide such information from the system 100C to the streaming client(s). Accordingly, the system 100C may comprise the control channel server function as described in WO 2013/098317 A1, and the streaming client(s) may communicate with the control channel server function of the system 100C via the streaming control channel.

In general, such a signalling channel may be used to notify the streaming client(s) of availability of a manifest and/or quality scores for streaming. Alternatively or additionally to said notifying, the signalling channel may also be used to send an (updated) manifest, (updated) quality scores and/or control information.

It is noted that in the embodiments shown in FIGS. 4 and 5, the streaming client(s) 080 are responsible for, based on the selection data, selecting and subsequently retrieving the appropriate segments from the stream sources 020. As such, the delivery mechanism for the appropriate segments follows, i.e., is conceptually analogous to, current HAS approaches, where the streaming client(s) themselves determine which segments to retrieve based on bandwidth information in the MPD.

With further reference to FIGS. 4 and 5, it is noted that the manifest 170 may be a multi-level manifest, i.e., be constituted by a hierarchy of sub-manifests. Accordingly, the description 172 of the segments may be provided in a different sub-manifest than the description 174 of the metadata stream. Such sub-manifests may be transmitted via separate channels. For example, the sub-manifest comprising the description 174 of the metadata stream may be transmitted via a signalling channel.

Figure 6:
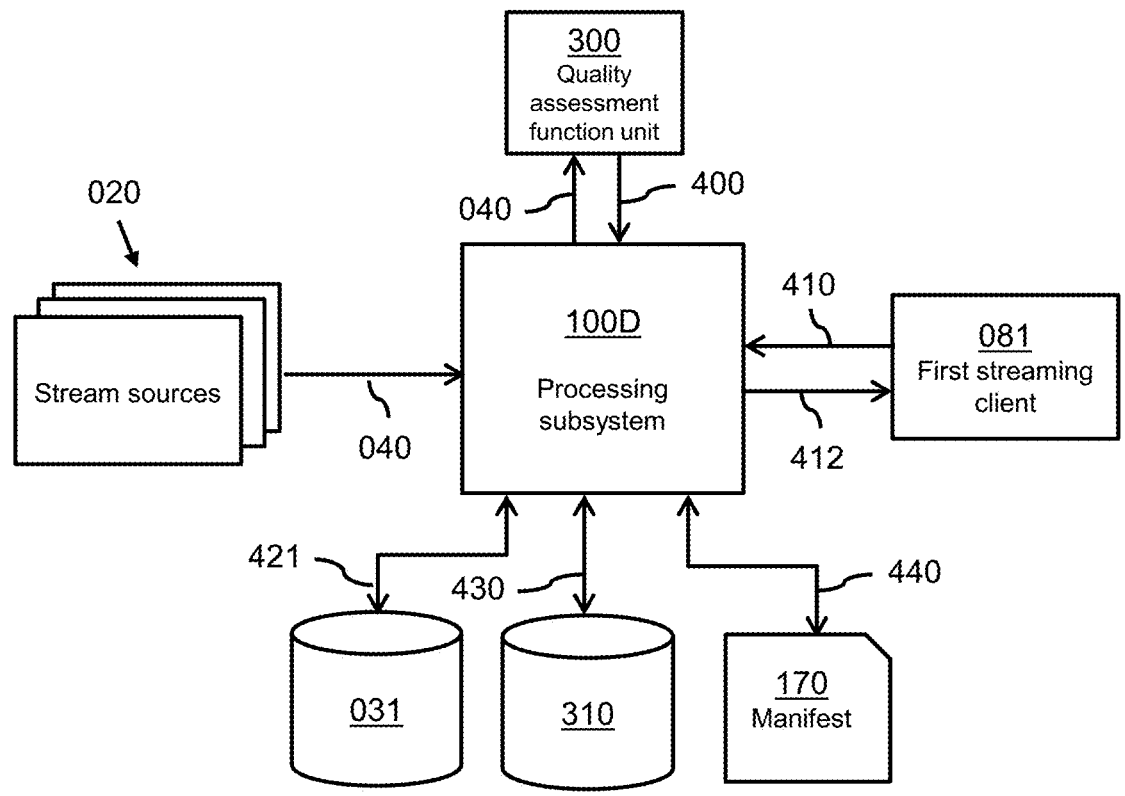
FIG. 6 shows a further embodiment of a system according to the invention, in which the system acts as a proxy between the streaming client and the stream sources by accessing the plurality of media streams and delivering a media stream to the streaming client established from different portions of said media streams.

FIG. 6 shows a further embodiment of a system 100D according to the invention, in which the system acts as a proxy between a streaming client 081 and a plurality of stream sources 020 by receiving the plurality of media streams and delivering a media stream to the streaming client established from segments having a suitable quality score. In this example, the source data 040 obtained from the plurality of streaming sources 020 comprises the segments of the media streams themselves. For that purpose, the system 100D may subscribe to streaming sessions provided by the plurality of stream sources 020. The system 100D may temporarily store the segments on a segment server 031, i.e., via a data communication 421. Moreover, the system 100D may apply one or more quality assessment functions to the source data 040 to assign a quality score to each concurrent segment of the respective media streams. FIG. 6 shows the quality assessment function(s) being implemented by a separate unit, namely a Quality Assessment Function unit 300, in short QAF unit. However, although shown separately, the QAF unit may be part of the system 100D. As a result of providing the source data 040 to the QAF unit 300, quality scores 400 may be obtained. The system 100D may (temporarily) store the quality scores in a quality score database 310, i.e., via a data communication 430. The system 100D may also access a manifest 170, which may be an original manifest obtained from the plurality of streaming sources 020 or an (updated) manifest generated after applying the one or more quality assessment functions to the source data 040. It is noted that although the manifest 170 is shown externally of the system 100D, the manifest 170 may be stored in an internal storage or memory of the system 100D.

Accordingly, the system 100D is enabled to respond to a request 410 for a manifest from the streaming client 081, and upon the streaming client 081 receiving the manifest, to a subsequent request of the streaming client 081 for a segment, namely by transmitting 412 the manifest and the requested segment to the streaming client 081.

It is noted that in the embodiment of FIG. 6, it may occur that the different media streams are misaligned with respect to a timeline of the event, e.g., by being received non-synchronously from the stream sources. In such a case, the system may employ inter-stream synchronization techniques, as known per se from the field of media synchronization, to ensure temporal alignment of the segments of the different media streams, thereby establishing a degree of concurrency of the segments. If explicitly segmented streams are being received which have unequal segment durations, synchronization of the received segments or re-segmentation may be performed, or some temporal misalignment may be accepted. It is noted that the alignment may not need to be perfect, e.g., frame-accurate in case of audiovisual data. Namely, since the media streams represent different recordings of the event, a certain degree of temporal misalignment may be allowable, e.g., be acceptable to a consumer. This may result in a duration of the streaming media presentation which may be longer than the duration of the event being recorded. It is noted that current adaptive streaming standards such as MPEG-DASH support temporally aligned segments as well as temporally non-aligned segments.

Figure 7:
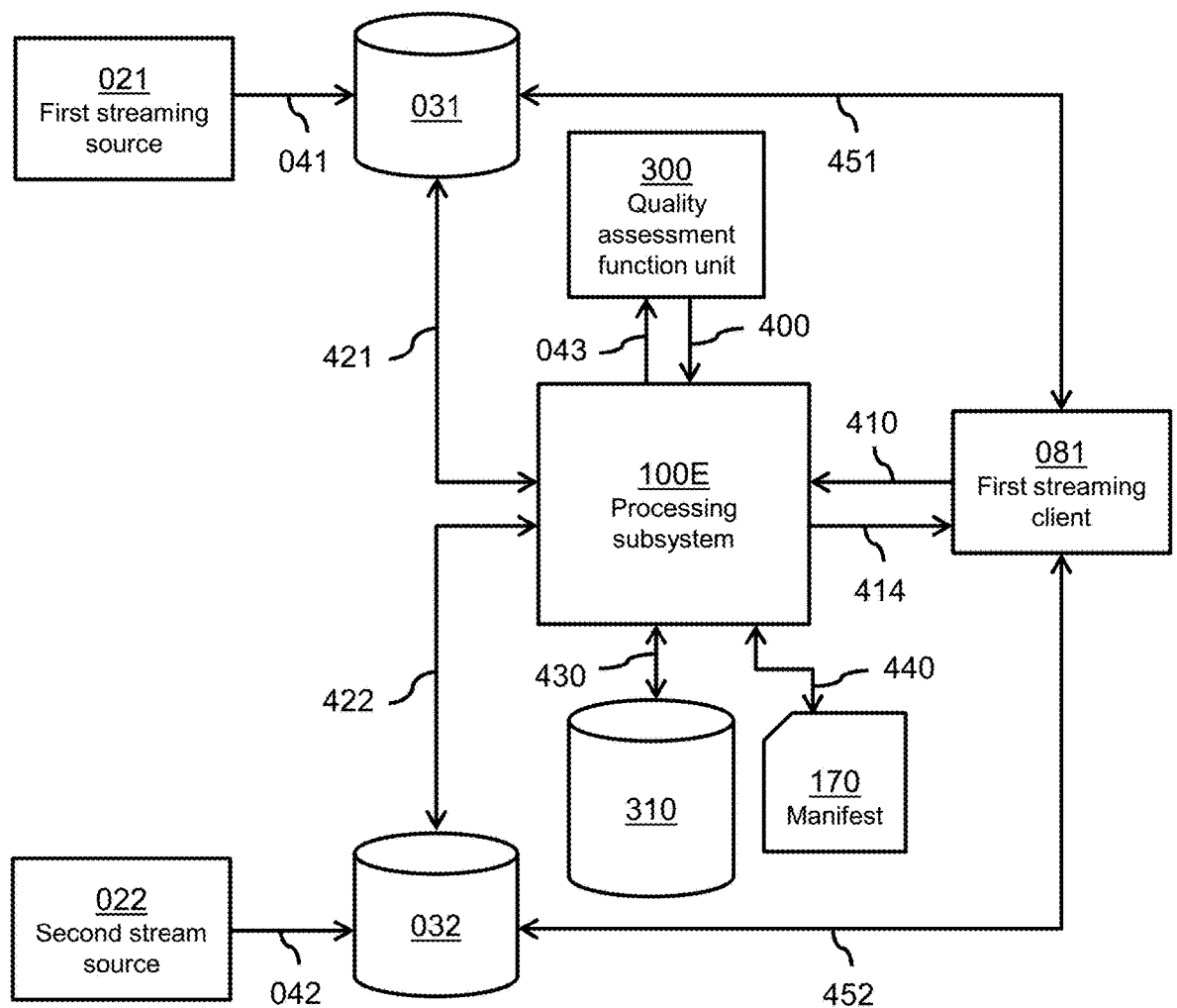
FIG. 7 shows a further embodiment of a system according to the invention, in which the system does not deliver the media stream itself but rather delivers a manifest and selection data to the streaming client.

FIG. 7 shows a further embodiment of a system according to the invention, in which the system 100E does not deliver the segments of media stream(s) to the streaming client 081 but rather delivers a manifest and selection data to the streaming client 081, thereby enabling the streaming client 081 to request the segments from the respective streaming sources. As such, the embodiment of FIG. 7 is conceptually more similar to those of FIGS. 4 and 5 than to the embodiment of FIG. 6, in which the system selects and subsequently delivers the selected segments to the streaming client.

FIG. 7 shows a first streaming source 021 and a second streaming source 022, with the first streaming source 021 being shown to provide first source data 041 to a first segment server 031 in the form of segments of a first media stream, and optionally metadata of the first media stream. The first segment server 031 at least temporarily stores the first source data 041. Moreover, the second streaming source 022 is shown to provide second source data 042 to a second segment server 032 in the form of segments of a second media stream, and optionally metadata of the second media stream. The system 100E may access the first source data 041 from the first segment server 031, namely via a first data communication 421. In addition, the system 100E may access the second source data 042 from the second segment server 032, namely via a second data communication 422. Effectively, in this embodiment, the first segment server 031 and second segment server 032 constitute stream sources.

Having obtained a selection of the first source data 041 and the second source data 042, the system 100E may provide such selected source data 043 to a QAF unit 300, which may apply at least one quality assessment function to the selected source data 043. As a result, quality scores 400 may be obtained. The system 100E may temporarily store the quality scores in a quality score database 310, i.e., via a data communication 430. The system 100E may also access a manifest 170. Accordingly, the system 100E is enabled to respond to a request 410 for a manifest from the streaming client 081, namely by transmitting 414 the manifest and the quality score(s) to the streaming client 081. The streaming client 081 is therefore enabled to, based on the quality scores and the manifest, request a suitable segment from either the first segment server 031, i.e., via a first segment request 451, or from the second segment server 032, i.e., via a second segment request 452. By doing so, and in particular, by dynamically switching between both segment servers for consecutive segments, the streaming client 081 is enabled to obtain a streaming presentation of the event.

Although not shown in FIG. 7, the system 100E may also deliver a manifest to the streaming client 081 which already comprises a suitable selection of segments from the respective streaming sources. For example, within the context of MPEG-DASH, the MPD may take the form as shown below. Here, the selection is represented by the consecutive periods identifying different stream sources. Moreover, it is noted that the MPD still enables a bandwidth-based quality selection per segment.

```xml
<?xml version="1.0" encoding="UTF-8"?>
<MPD
    xmlns:xsi="http://www.w3.org/2001/XMLSchema-instance"
    xmlns="urn:mpeg:dash:schema:mpd:2011"
    xsi:schemaLocation="urn:mpeg:dash:schema:mpd:2011 DASH-MPD.xsd"
    type="static"
>
    <!-- First period of 30 seconds using media stream of camera 1 -->
    <Period id="1" duration="PT30S">
        <BaseURL>http://camera1.example.com/</BaseURL>
        <AdaptationSet
            mimeType="video/mp2t"
            codecs="avc1.4D401F,mp4a"
            frameRate="24000/1001"
            segmentAlignment="true"
            subsegmentAlignment="true"
            bitstreamSwitching="true"
            startWithSAP="2"
            subsegmentStartsWithSAP="2">
            <ContentComponent contentType="video" id="481"/>
            <ContentComponent contentType="audio" id="482" lang="en"/>
            <ContentComponent contentType="audio" id="483" lang="es"/>
            <BaseURL>SomeEvent/</BaseURL>
            <SegmentTemplate
                media="$RepresentationID$__$Number%05d$.ts"
                index="$RepresentationID$.sidx"
                initialization="$RepresentationID$-init.ts"
                bitstreamSwitching="$RepresentationID$-bssw.ts"
                duration="4"/>
            <Representation id="1400kbps" bandwidth="1540000" width="960" height="544"/>
            <Representation id="2700kbps" bandwidth="2970000" width="1280" height="720"/>
        </AdaptationSet>
    </Period>
    <!-- Following period of 20 seconds using media stream of camera 2 -->
    <Period id="1" duration="PT20S">
        <BaseURL>http://camera2.example.com/</BaseURL>
        <AdaptationSet
            mimeType="video/mp2t"
            codecs="avc1.4D401F,mp4a"
            frameRate="24000/1001"
            segmentAlignment="true"
            subsegmentAlignment="true"
            bitstreamSwitching="true"
            startWithSAP="2"
            subsegmentStartsWithSAP="2">
            <ContentComponent contentType="video" id="481"/>
            <ContentComponent contentType="audio" id="482" lang="en"/>
            <ContentComponent contentType="audio" id="483" lang="es"/>
            <BaseURL>SomeEvent/</BaseURL>
            <SegmentTemplate
                media="$RepresentationID$__$Number%05d$.ts"
                index="$RepresentationID$.sidx"
                initialization="$RepresentationID$-init.ts"
                bitstreamSwitching="$RepresentationID$-bssw.ts"
                duration="4"/>
            <Representation id="1400kbps" bandwidth="1540000" width="960" height="544"/>
            <Representation id="2700kbps" bandwidth="2970000" width="1280" height="720"/>
        </AdaptationSet>
    </Period>
</MPD>
```

It is noted that a possible disadvantage of a manifest comprising a suitable selection of segments may be its size, in that the shorter the periods, the more Period elements that need to be declared, and therefore the larger the size of the manifest.

To prevent the size from becoming too large, a single period may be declared for each stream source, e.g., for each camera, while providing additional attributes which define multiple intervals during which the stream source is to be selected. For example, as a modification to the MPEG-DASH standard, @startInterval and @durationInterval attributes may be introduced in the Period element in the following way:

```
<Period id="1" startInterval="PT0S,PT40S"
durationInterval="PT30S,PT30S"">
    <BaseURL>http://camera1.example.com/</BaseURL>
    <AdaptationSet
        (...)
    </AdaptationSet>
</Period>
<Period id="2"
startInterval="PT30S,PT70S"
durationInterval="PT10S,PT30S">
    <BaseURL>http://camera2.example.com/</BaseURL>
    <AdaptationSet
        (...)
    </AdaptationSet>
</Period>
```

It is noted that in the above and following examples, various attributes of the AdapationSet(s) have been omitted for conciseness reasons. The above illustrated modification involves defining multiple time intervals within a period by specifying multiple start and duration values in the @startInterval and @durationInterval attributes, thereby essentially defining sub-periods. Such sub-periods share all properties of the period except for representing a different time interval during which a (different) stream source is to be selected.

Another possibility may be that the use of the SegmentTimeline element which enables an MPD author to describe discontinuities in the timeline of a Representation within a Period. As such, there may be one Period and an AdaptationSet declared for each stream source, and different SegmentTimeline elements may be declared per AdaptationSet to define the time intervals they cover.

Another possibility is to make use of reference elements. These are typically used to link to a remote document via xlink (see hitp://www.w3.org/TRixinki), e.g., to populate a MPD with AdaptationSets contained in an external MPD. This concept may be extended or re-used to reference local elements, e.g., in the following manner:

```
<Period id="1" start="PT0S" duration="PT30S">
    <BaseURL>http://camera1.example.com/</BaseURL>
```

```
    <AdaptationSet
        (...)
    </AdaptationSet>
</Period>
<Period id="2" xlink:href="#1" start="PT40S" duration="PT30S">
    [Here everything will copied from Period with id=1]
</Period>
```

Another possible disadvantage of a manifest comprising a suitable selection of segments may be that frequent updates of the MPD may be needed in order to limit the end-to-end delay to an acceptable level. Here, the end-to-end delay is at least in part determined by the period covered by the MPD in that, when the MPD covers 1 minute of content, the streaming client using the MPD is at least 1 minute behind the 'live' presentation of the event. Accordingly, the end-to-end delay may be reduced by limiting the total presentation time of an MPD to an acceptable length, e.g., 20 seconds or less. To avoid the need for more frequent MPD updates in case of the MPD covering shorter periods of time, the streaming source may be selected outside of the MPD so that the MPD authoring is independent from the stream source selection.

For example, it is known to use a template mechanism for generating the name of the segments in the URL, see, e.g., the SegmentTemplate element. This concept may be extended to the BaseURL, e.g., in the following manner:

```
<Period id="1">
    <BaseURL>http://camera1.example.com/$AdaptationSetID$/</BaseURL>
    <AdaptationSet id="camera1"
        (...)
    </AdaptationSet>
    <AdaptationSet id="camera2"
        (...)
    </AdaptationSet>
</Period>
```

In this scenario, the streaming client may receive the AdaptationSetId that is currently recommended, e.g., provides the most suitable quality, via a signalling channel, thereby enabling the streaming client to switch between stream sources. In case no value is given to the streaming client, it may start with an arbitrary value.

Another possibility may be that one Period element may declare all AdaptationSets, i.e., for all streaming sources. The streaming client may then receive via a signalling channel a recommendation on which AdaptationSet to select.

It is noted that, in general, the selection data may, in addition to one or more quality scores, further comprise association information for enabling the streaming client to associate the quality scores with the plurality of stream sources. Moreover, the processing subsystem may be configured for, when generating the selection data, maintaining a previous selection of one of the plurality of media streams when a difference in quality score between a concurrent portion of said previous media stream and the selected portion is below a quality threshold. As such, a possible increase in quality score may be determined not to outweigh the disadvantages of switching to a segment from a different media stream. Similarly, the previous selection may be maintained when a length of the concurrent portion is below a length threshold.

It is noted that the above embodiments involve segmented media streams. However, the invention may equally be applied to non-segmented media streams. The processing subsystem may segment such segmented media streams. Alternatively, the dynamic switching between media streams may be performed on a different granularity than the aforementioned segment-by-segment basis. For example, dynamic switching may be performed at codec level, e.g., by switching streams at the start of a Group-Of-Pictures (GOP) interval, which start with independently decodable video frames, commonly referred to as I-frames or as IDR frames in H.264/MPEG-4 AVC. It is noted that such switching may be performed despite the media streams being segmented. Accordingly, the switching may be performed within, i.e., during, concurrent segments.

A further optional aspect of the invention concerns the following: in determining which segment to select, the ingress bandwidth of the streaming source(s) may be taken into account in addition to the plurality of quality scores. This enables a segment to be selected which, given an ingress bandwidth of the streaming source(s), provides a suitable quality to the streaming client. Accordingly, if different streaming sources share a common network connection, optimal use may be made of the limited capacity of the ingest connection, e.g., by assigning a relatively high-quality score to a segment which is already streaming to other streaming client(s). Another advantage may be that the system may use knowledge of the ingress bandwidth of the streaming source(s) to prevent selecting segments of streaming source(s) which are unable to stream said segments to streaming clients due to bandwidth limitations.

Additionally or alternatively, the available bandwidth to the streaming client(s) may be taken into account when selecting the segment. This optional aspect is based on the recognition that when a streaming client has limited bandwidth availability and uses adaptive streaming based, the streaming client will typically switch to a representation with a lower bitrate, e.g. a low bandwidth and thus low-quality media stream. This representation, however, might be of such low quality that it might not be suited anymore for presentation, i.e., provide a negative user experience. In a scenario where multiple alternative recordings of an event are available, it might be the case that different recordings provide different qualities despite having identical bitrates. This may also hold for relatively low bitrates, e.g., for a video bitrate of 500 kbit/s. Accordingly, it may be beneficial to select a segment from a different recording of the event when having to switch to a different media stream due to a reduction in available bandwidth. For example, a first stream source may provide a first media stream of 500 kbit/s of which a segment '10' has been assigned a quality score of 1 (out of 5). Moreover, a second stream source may provide a second media stream of also 500 kbit/s of which the segment '10' has been assigned a quality score of 2 (out of 5). When the streaming client, which may be currently streaming a media stream of 1000 kbit/s, needs to switch to a lower quality following segment '9', it may select segment '10' of the second stream source since this has been assigned a higher quality score than the corresponding concurrent segment '10' of the first stream source. Thus, in general, the selecting of one of the plurality of stream sources may be based on a comparison of the plurality of quality scores as well as a comparison between the available bandwidth of a streaming client and the bitrate of a respective media stream.

It is noted that, in general, the selection data may comprise attributes of the stream source or recording device, such as location data, orientation data, etc. These attributes may have been obtained as metadata from the stream source, and may be used by a streaming client, e.g., to enable a viewer to perform further personal selections if more than one media stream is forwarded to the viewer's streaming client.

It is further noted that the quality assessment function may also be incorporated in the stream sources themselves. Accordingly, the stream sources may perform a quality assessment and provide the resulting quality scores to the system, e.g., by adding metadata to the media streams themselves. Accordingly, the quality assessment may be performed at the stream source(s) rather than at the system.

Moreover, the stream sources may represent sources of live streams, on-demand streams or a combination of both. Accordingly, the streaming presentation established by the system may incorporate segments from such live streams as well as segments from on-demand streams. This may allow, e.g., instant replay functionality.

It is further noted that, in general, the invention may be used to establish N different streaming presentations, e.g., in the form of N media streams, N different playlists, etc, based on M different media streams, with N being smaller than M. This may enable the number of incoming media streams to be reduced.

Figure 8:
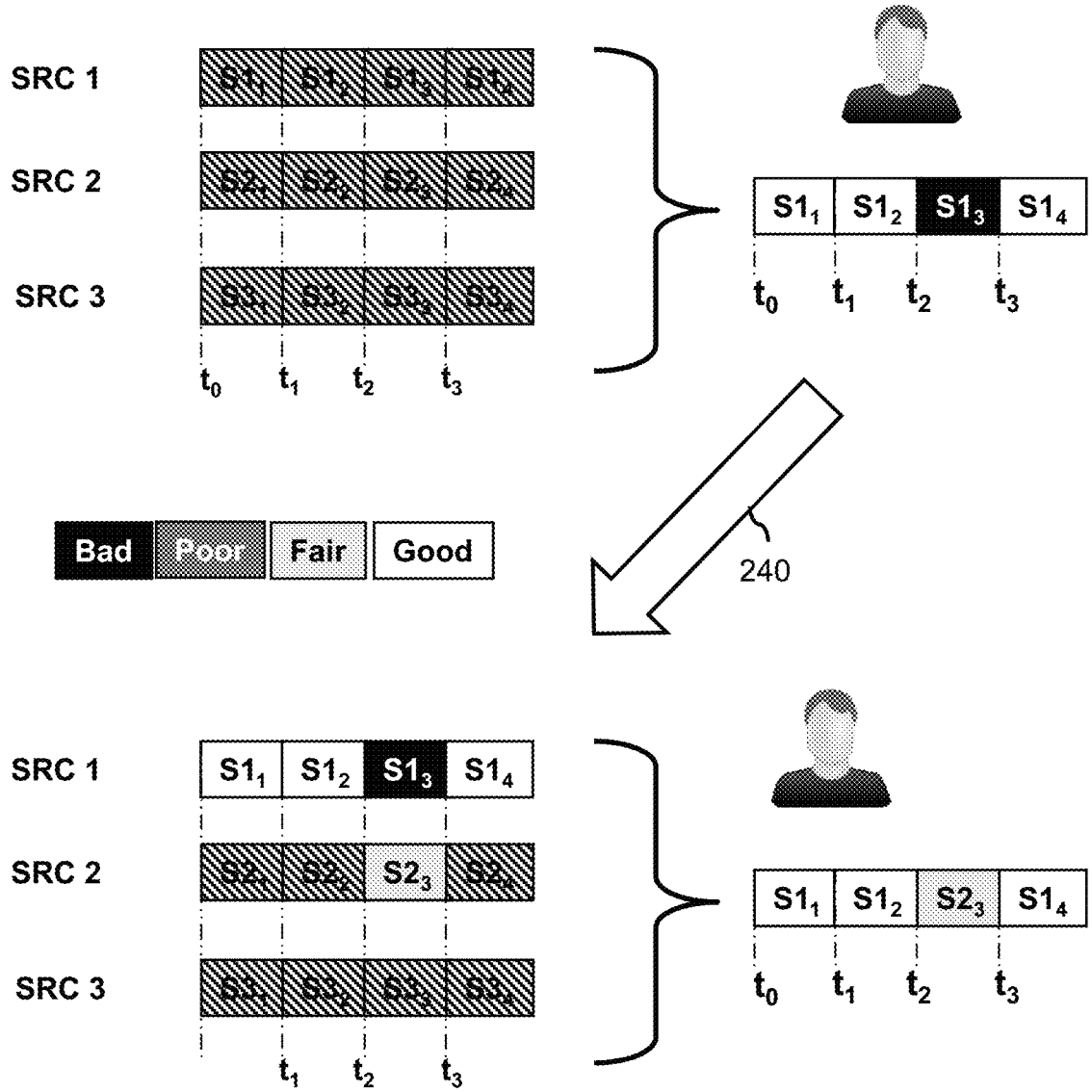
FIG. 8 shows a feedback mechanism for enabling a consumer to provide feedback on a quality of a segment, thereby improving the quality assessment.

FIG. 8 illustrates a further optional aspect of the invention, in that it shows a feedback mechanism for enabling a consumer to provide feedback on a perceived quality, thereby augmenting the quality assessment function. Here, initial viewers of a (live) streaming session may provide implicit or explicitly feedback 240 on the perceived quality. For instance, if a quality assessment has not been performed yet (indicated in FIG. 8 by the segments being dashed) or if the selection of segments obtained from the quality assessment function is suboptimal, the feedback 240 can be used to improve the selection. In the example of FIG. 8, this is shown by the user rating segment $S1_3$ as having a bad quality, either explicitly, e.g., via a rating mechanism provided by the streaming client, or implicitly, e.g., by the user temporarily requesting a different media stream. The system is therefore enabled to learn that segment $S1_3$ has a bad quality. The system may then perform a quality assessment on one or more alternative segments, e.g., segment $S2_3$, thereby rating the segment as 'Fair'. Alternatively, the system may select the segment $S2_3$ without performing a rating. Accordingly, for subsequent streaming sessions, the system may select the segment $S2_3$ instead of the segment $S1_3$ for being included in the streaming presentation of the event. It will be appreciated that such feedback may take various other forms and may be used in various ways. For example, the system may learn from the feedback, e.g., by adapting the quality assessment function or a weighting between different functions. The system may also use the feedback to override the quality assessment function. Another example is that the feedback may be used to personalize the selection.

Figure 9:
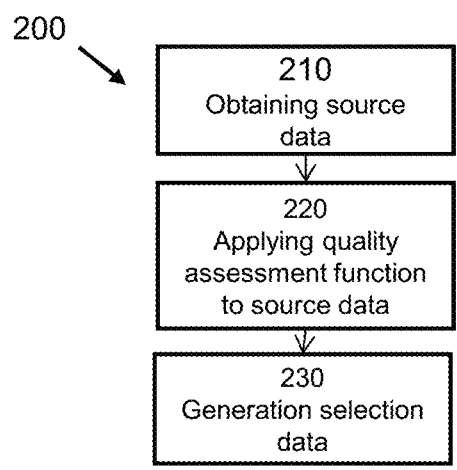
FIG. 9 shows a method according to the invention.

FIG. 9 shows a method for providing a streaming client with a streaming presentation of an event. The method 200 may correspond to an operation of a system according to the invention. However, this is not a limitation in that the method 200 may also be performed separately, e.g., on a different system, or in a distributed manner.

The method 200 comprises, in a step titled "OBTAINING SOURCE DATA", obtaining 210 source data from the plurality of stream sources, the source data being constituted by content data and/or metadata of concurrent portions of the plurality of media streams, the concurrent portions representing concurrent time periods of the event. The method 200 further comprises, in a step titled "APPLYING QUALITY ASSESSMENT FUNCTION TO SOURCE DATA", applying 220 at least one quality assessment function to the source data for assigning a quality score to each one of the concurrent portions, thereby establishing a plurality of quality scores. The method 200 further comprises, in a step titled "GENERATING SELECTION DATA", generating 230 selection data for enabling the streaming client to access a selected one of the concurrent portions of a respective media stream, the selected portion having been selected based on a comparison of the plurality of quality scores.

It will be appreciated that a method according to the invention may be implemented in the form of a computer program which comprises instructions for causing a processor system to perform the method. The method may also be implemented in dedicated hardware, or as a combination of the above.

Figure 10:
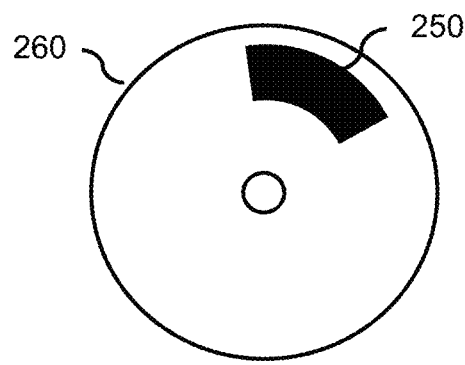
FIG. 10 shows a computer program product comprising instructions for causing a processing system to perform the method.

The computer program may be stored in a non-transitory manner on a computer readable medium. Said non-transitory storing may comprise providing a series of machine readable physical marks and/or a series of elements having different electrical, e.g., magnetic, or optical properties or values. FIG. 10 shows a computer program product comprising the computer readable medium 260 and the computer program 250 stored thereon. Examples of computer program products include memory devices, optical storage devices, integrated circuits, servers, online software, etc.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for providing a streaming client with a streaming presentation of an event, the streaming presentation having been obtained by dynamically switching between a plurality of media streams which represent different recordings of the event, the plurality of media streams being accessible from a respective plurality of recording devices recording the event, and the system comprising:
an input for obtaining source data from the plurality of recording devices, the source data being constituted by content data and/or metadata of concurrent portions of the plurality of media streams, the concurrent portions representing concurrent time periods of the event, each media stream comprising multiple consecutive portions;
a processing subsystem configured to, for each of the consecutive portions:
i) apply at least one content quality assessment function to the source data for assigning a content quality score to each one of the concurrent portions, thereby establishing a plurality of content quality scores for the respective plurality of recording devices;
ii) generate selection data for enabling the streaming client to select, from a manifest, one of the plurality of recording devices which provides access to a selected one of the concurrent portions of a respective media stream, the selected portion having been selected based on a comparison of the plurality of content quality scores, wherein the selection data comprises at least part of the plurality of content quality scores, wherein when generating the selection data, a previous selection of one of the plurality of media streams is maintained when a length of the concurrent portion of the one of the plurality of media streams is below a length threshold;
iii) format said at least part of the plurality of content quality scores as a metadata stream; and
iv) include address information in the manifest for enabling the streaming client to access the metadata stream and for enabling the streaming client to access the plurality of recording devices; and
a client interface for providing the manifest and the metadata stream to the streaming client.

2. The system according to claim 1, wherein the selection data further comprises association information for enabling the streaming client to associate said content quality scores with the plurality of recording devices.

3. The system according to claim 1, wherein the processing subsystem is configured for generating the manifest for the streaming client, the manifest comprising a playlist identifying different portions of the plurality of media streams for being consecutively accessed from respective ones of the plurality of recording devices, at least one of the different portions having been selected based on the selection data.

4. The system according to claim 3, wherein the processing subsystem is configured for updating the manifest for a new concurrent portion.

5. The system according to claim 1, wherein the processing subsystem is configured for, when generating the selection data, maintaining a previous selection of one of the plurality of media streams when
a difference in content quality score between a concurrent portion of said previous media stream and the selected portion is below a quality threshold.

6. The system according to claim 1, wherein the plurality of media streams comprises one or more segmented media streams, and wherein the concurrent portions are constituted at least in part by concurrent segments of the one or more segmented media streams.

7. The system according to claim 1, configured for acting as a proxy between the streaming client and the plurality of recording devices by:
i) receiving the concurrent portions of the plurality of media streams from the plurality of recording devices; and
ii) delivering the selected portion to the streaming client.

8. The system according to claim 7, wherein at least one of the plurality of media streams is received in non-segmented form, and wherein the processing subsystem is configured for segmenting said media stream.

9. The system according to claim 1, wherein the selected portion is selected based on the selected portion having a highest content quality score amongst the concurrent portions.

10. A manifest for a streaming client for obtaining a streaming presentation of an event by the streaming client dynamically switching between a plurality of media streams which represent different recordings of the event, the plurality of media streams being accessible from a respective plurality of recording devices recording the event, the manifest comprising address information for enabling the streaming client to access a metadata stream comprising selection data comprising at least a part of a plurality of content quality scores selection data as generated by the system according to claim 1, and address information for enabling the streaming client to access the plurality of recording devices recording the event.

11. A method for providing a streaming client with a streaming presentation of an event, the streaming presentation having been obtained by dynamically switching between a plurality of media streams which represent different recordings of the event, the plurality of media streams being accessible from a respective plurality of recording devices recording the event, and the method comprising:
- obtaining source data from the plurality of recording devices, the source data being constituted by content data and/or metadata of concurrent portions of the plurality of media streams, the concurrent portions representing concurrent time periods of the event, each media stream comprising multiple consecutive portions;
- applying at least one content quality assessment function to the source data for assigning a content quality score to each one of the concurrent portions, thereby establishing a plurality of content quality scores;
- generating selection data for enabling the streaming client to select, from a manifest, one of the plurality of recording devices which provides access to a selected one of the concurrent portions of a respective media stream, the selected portion having been selected based on a comparison of the plurality of content quality scores, wherein the selection data comprises at least part of the plurality of content quality scores, wherein when generating the selection data, a previous selection of one of the plurality of media streams is maintained when a length of the concurrent portion of the one of the plurality of media streams is below a length threshold;
- formatting said at least part of the plurality of content quality scores as a metadata stream;
- including address information in the manifest for enabling the streaming client to access the metadata stream and for enabling the streaming client to access the plurality of recording devices; and
- providing the manifest and the metadata stream to the streaming client.

12. A computer-readable non-transitory storage medium comprising instructions for causing a processing system to perform the method according to claim 11.

13. The method according to claim 11, the method further comprising:
- generating the manifest for the streaming client, the manifest comprising a playlist identifying different portions of the plurality of media streams for being consecutively accessed from respective ones of the plurality of recording devices, at least one of the different portions having been selected based on the selection data.

14. The method according to claim 11, the method further comprising:
- when generating the selection data, maintaining a previous selection of one of the plurality of media streams when
- a difference in content quality score between a concurrent portion of said previous media stream and the selected portion is below a quality threshold.

* * * * *